(No Model.)
J. N. HAGER.
TOOL BRACKET.
No. 468,802. Patented Feb. 16, 1892.
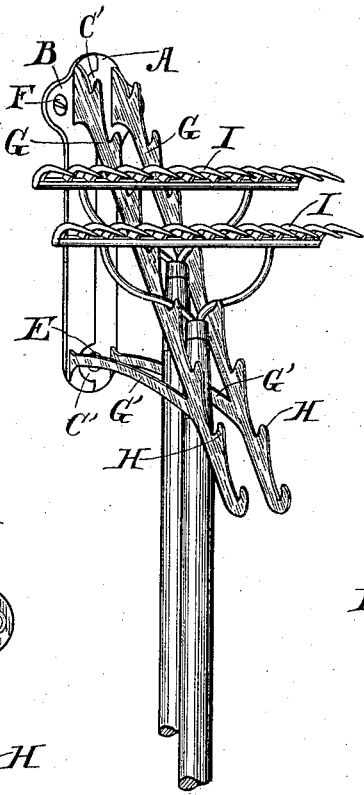
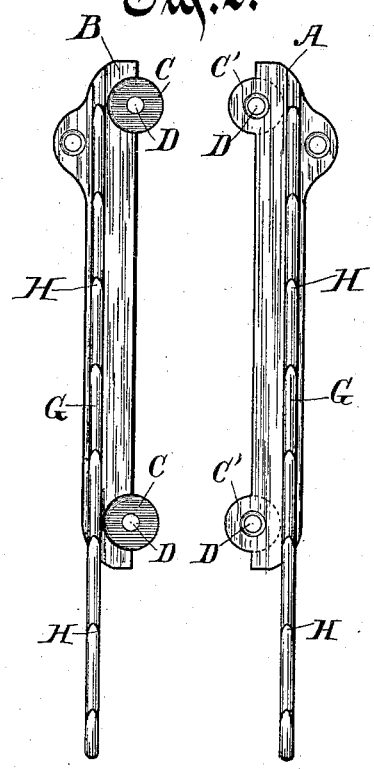
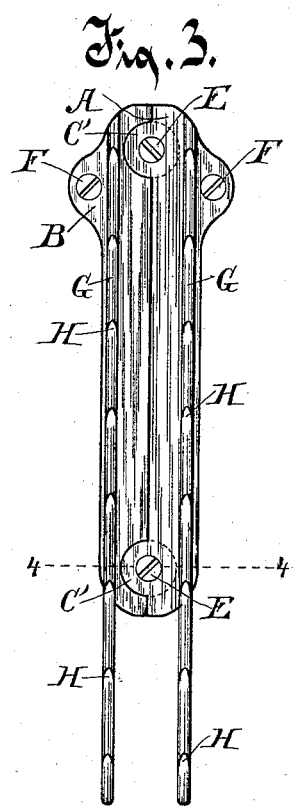
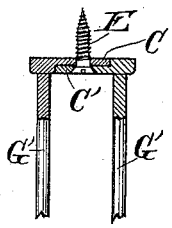
Witnesses.
C. N. Keeney,
Anna V. Faust.
Inventor.
John N. Hager
By C. T. Benedict
Attorney.

UNITED STATES PATENT OFFICE.

JOHN N. HAGER, OF FORT ATKINSON, WISCONSIN.

TOOL-BRACKET.

SPECIFICATION forming part of Letters Patent No. 468,802, dated February 16, 1892.

Application filed June 13, 1891. Serial No. 396,086. (No model.)

*To all whom it may concern:*

Be it known that I, JOHN N. HAGER, of Fort Atkinson, in the county of Jefferson and State of Wisconsin, have invented a new and useful Improvement in Tool-Brackets, of which the following is a description, reference being had to the accompanying drawings, which are a part of this specification.

My invention relates to a bracket arranged to be secured to the wall of a building and adapted to support rakes, shovels, hoes, and other similar articles of merchandise removably thereon.

The device is constructed especially for use in hardware stores, but may be used in tool-houses or other situations where economy of space is important or the convenient supporting of tools is desired.

In the drawings, Figure 1 is a view of my complete device with two rakes supported thereon in the manner common when the device is in use. Fig. 2 is a front view of the disassembled parts of the bracket. Fig. 3 is a front view of the bracket as secured to the wall of the building. Fig. 4 is a transverse section on line 4 4 of Fig. 3.

My improved device is advisably constructed of malleable iron.

The device consists of two longitudinal plates A and B, each having a longitudinal edge formed to abut against each other, and projecting ears or lugs C C', arranged in pairs on the two plates A and B to register and overlap each other, each lug being provided with an aperture D, through which in pairs a screw E is turned into the wall. These screws hold the two parts of the bracket together and with screws F secure the bracket to the supporting-wall. Each plate A and B is provided with an arm G, projecting outwardly and downwardly at an oblique angle, preferably, of about forty-five degrees, and a brace G', preferably constructed integrally with the plate A or B. These arms, when the bracket is secured to the wall in the form shown in Figs. 1 and 3, are parallel to and at a little distance from each other, and they are each provided with a series of hooks or ledges H opposite each other, adapted to receive and support tools thereon in the manner shown in Fig. 1, where the rakes I I are supported on the bracket by resting the branching or neck portions of the handle of the rake on the two opposite ledges of the bracket, the stem or handle hanging between the two arms of the bracket. It will be seen that in this manner tools can be supported conveniently and in compact form, the least possible space being required for them, while they may be conveniently removed for use or exhibition.

It will be seen that the tools are so supported that their shanks or handles hang vertically and without contact, while the heads of the tools, as exemplified by the rakes illustrated in Fig. 1, extend out horizontally one above the other, thereby supporting each of said tools independently and entirely free from contact with contiguous ones and in such manner that all the heads of the tools or implements are in full view from the front, and each may be inspected without removing any other tool from the rack.

By constructing my improved tool-bracket of two separate sections the casting of the device is rendered much less difficult and expensive, and by providing the lugs C C', having registering apertures, the device practically becomes a unit when secured to the wall or other medium of support.

What I claim as new, and desire to secure by Letters Patent, is—

A tool-bracket constructed in two parts, comprising two plates adapted to rest against and be supported on a vertical wall, the plates being arranged to abut against each other at their longitudinal edges and being provided with registering and overlapping ears having apertures for screws therethrough, and an arm on each plate projecting outwardly and downwardly at an oblique angle, each arm having a series of ledges or hooks thereon, the arms and ledges being arranged to be opposite to and at a little distance from each other when the bracket is secured to the wall, providing an unobstructed space between the arms, substantially as described, and for the purpose set forth.

In testimony whereof I affix my signature in presence of two witnesses.

JOHN N. HAGER.

Witnesses:
C. A. CASWELL,
H. B. WILLANE.